US008905270B2

(12) United States Patent
Alluigi

(10) Patent No.: US 8,905,270 B2
(45) Date of Patent: Dec. 9, 2014

(54) TRIGGER DISPENSER FOR LIQUIDS WITH BUTT VALVES

(75) Inventor: Riccardo Alluigi, Alessandria (IT)

(73) Assignee: Guala Dispensing S.p.A., Alessandria (IT)

( * ) Notice: Subject to any disclaimer, the term of this patent is extended or adjusted under 35 U.S.C. 154(b) by 0 days.

(21) Appl. No.: 13/577,450

(22) PCT Filed: Mar. 3, 2011

(86) PCT No.: PCT/IB2011/050907
§ 371 (c)(1),
(2), (4) Date: Aug. 7, 2012

(87) PCT Pub. No.: WO2011/128786
PCT Pub. Date: Oct. 20, 2011

(65) Prior Publication Data

US 2013/0026192 A1 Jan. 31, 2013

(30) Foreign Application Priority Data

Apr. 14, 2010 (IT) .............................. BS2010A0077

(51) Int. Cl.
*G01F 11/00* (2006.01)
*B05B 11/00* (2006.01)

(52) U.S. Cl.
CPC ......... *B05B 11/3016* (2013.01); *B05B 11/3069* (2013.01); *B05B 11/3067* (2013.01); *B05B 11/3057* (2013.01); *B05B 11/3011* (2013.01)
USPC .................................... 222/321.8; 222/383.1

(58) Field of Classification Search
USPC ........................... 222/383.1, 382, 380, 321.8
See application file for complete search history.

(56) References Cited

U.S. PATENT DOCUMENTS

| | | | | | |
|---|---|---|---|---|---|
| 4,624,413 | A | * | 11/1986 | Corsette | 239/333 |
| 4,986,453 | A | | 1/1991 | Lina et al. | |
| 5,297,701 | A | * | 3/1994 | Steijns et al. | 222/153.05 |
| 5,341,965 | A | * | 8/1994 | Maas et al. | 222/340 |
| 5,423,460 | A | * | 6/1995 | Thomann | 222/382 |
| 5,425,482 | A | * | 6/1995 | Foster et al. | 222/207 |

(Continued)

FOREIGN PATENT DOCUMENTS

| | | | |
|---|---|---|---|
| DE | 102007024724 | A1 | 7/2008 |
| FR | 2928357 | A1 | 9/2009 |

(Continued)

OTHER PUBLICATIONS

Diaphragm—Definition and More from the Free Merriam-Webster Dictionary.pdf, Dec. 9, 2013.*

(Continued)

*Primary Examiner* — Paul R Durand
*Assistant Examiner* — Randall Gruby
(74) *Attorney, Agent, or Firm* — Kilyk & Bowersox, P.L.L.C.

(57) ABSTRACT

A trigger dispenser (1) for liquids comprises a suction valve (30) comprising a diaphragm (32) housed in the pumping chamber (4) and a delivery valve (60), separate from the suction valve (30), comprising a baffle (62) external to the dispensing pipe (14). The diaphragm (32) of the suction valve (30), during liquid dispensing, abuts on the bottom wall (**10*b*) of the pumping chamber (4) land covers the suction opening (6*a*), and the baffle (62) of the delivery valve (60), during the return, abuts on the crown surface (18) which surrounds the inlet opening (14*a*) of the dispensing pipe (14**).

19 Claims, 5 Drawing Sheets

(56) References Cited

U.S. PATENT DOCUMENTS

| | | | | |
|---|---|---|---|---|
| 5,467,900 | A * | 11/1995 | Maas et al. | 222/341 |
| 5,553,752 | A * | 9/1996 | Foster et al. | 222/340 |
| 5,706,984 | A * | 1/1998 | Tada et al. | 222/182 |
| 5,857,591 | A * | 1/1999 | Bachand | 222/1 |
| 5,884,845 | A * | 3/1999 | Nelson | 239/333 |
| 5,938,081 | A * | 8/1999 | Foster et al. | 222/153.09 |
| 5,984,149 | A * | 11/1999 | Thanisch et al. | 222/340 |
| 6,032,814 | A * | 3/2000 | Foster | 215/332 |
| 6,131,820 | A * | 10/2000 | Dodd | 239/106 |
| 6,216,912 | B1 * | 4/2001 | Keung et al. | 222/1 |
| 6,378,739 | B1 * | 4/2002 | Maas et al. | 222/383.1 |
| 6,789,303 | B2 * | 9/2004 | Maas et al. | 29/453 |
| 7,175,056 | B2 * | 2/2007 | Buti | 222/383.1 |
| 7,455,198 | B2 * | 11/2008 | Foster et al. | 222/383.1 |
| 7,967,171 | B2 * | 6/2011 | Foster et al. | 222/383.1 |
| 8,104,646 | B2 * | 1/2012 | Foster et al. | 222/383.1 |
| 8,714,415 | B2 * | 5/2014 | Rech et al. | 222/376 |
| 2004/0222243 | A1 * | 11/2004 | Sweeton | 222/383.1 |
| 2005/0092778 | A1 * | 5/2005 | Bistolfi | 222/383.1 |
| 2007/0131718 | A1 * | 6/2007 | Bistolfi | 222/189.09 |
| 2007/0210106 | A1 * | 9/2007 | Foster | 222/153.06 |
| 2007/0278252 | A1 * | 12/2007 | Alluigi | 222/385 |
| 2007/0295757 | A1 * | 12/2007 | Foster et al. | 222/340 |
| 2008/0116222 | A1 * | 5/2008 | Alluigi | 222/153.13 |
| 2008/0230563 | A1 * | 9/2008 | Maas et al. | 222/383.1 |
| 2009/0152304 | A1 | 6/2009 | Foster | |
| 2010/0018999 | A1 * | 1/2010 | Maas et al. | 222/383.1 |
| 2011/0108447 | A1 * | 5/2011 | Hoefing et al. | 206/459.5 |
| 2011/0226816 | A1 * | 9/2011 | Alluigi | 222/401 |
| 2011/0240681 | A1 * | 10/2011 | Foster et al. | 222/383.1 |
| 2012/0199605 | A1 * | 8/2012 | Alluigi | 222/23 |
| 2012/0261438 | A1 * | 10/2012 | Dejong et al. | 222/383.1 |

FOREIGN PATENT DOCUMENTS

| | | | |
|---|---|---|---|
| JP | 10-146546 | | 6/1998 |
| WO | 00/33970 | A1 | 6/2000 |
| WO | 2008/116656 | A1 | 10/2008 |
| WO | 2011/128787 | A1 | 10/2011 |
| WO | 2011/128788 | A1 | 10/2011 |

OTHER PUBLICATIONS

Abut—Definition and More from the Free Merriam-Webster Dictionary.pdf , Dec. 9, 2013.*

Distinct—Definition and More from the Free Merriam-Webster Dictionary.pdf , Dec. 9, 2013.*

International Search Report issued in corresponding International Patent Application No. PCT/IB2011/050907 dated Jun. 22, 2011 (12 pages).

* cited by examiner

Fig. 10
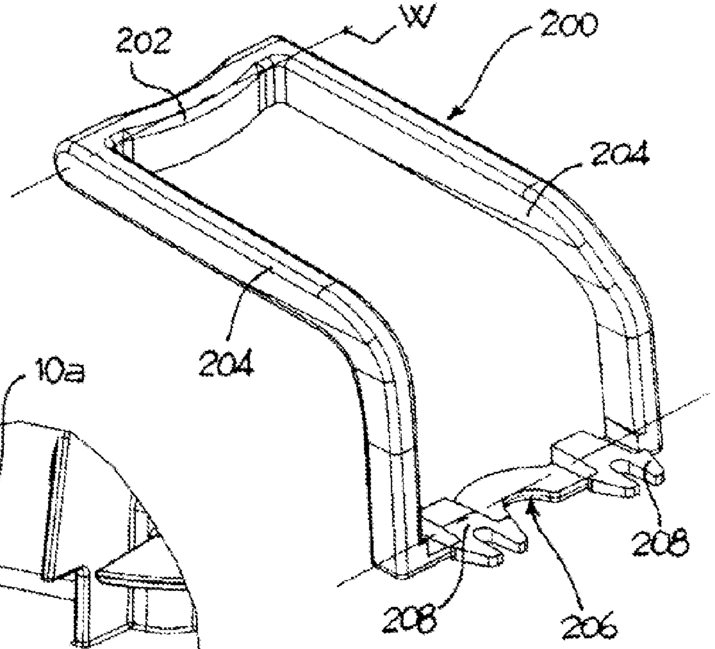
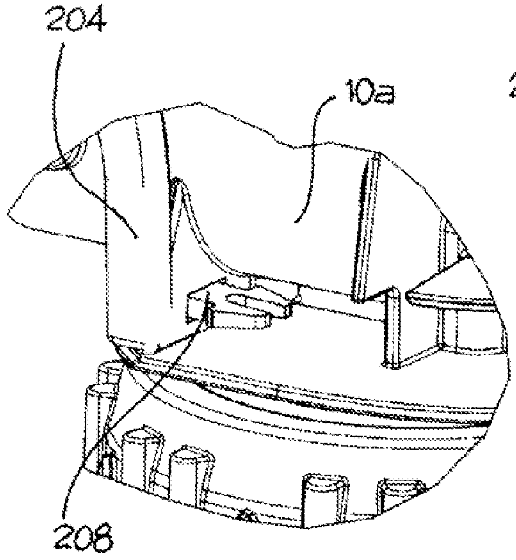
Fig. 9
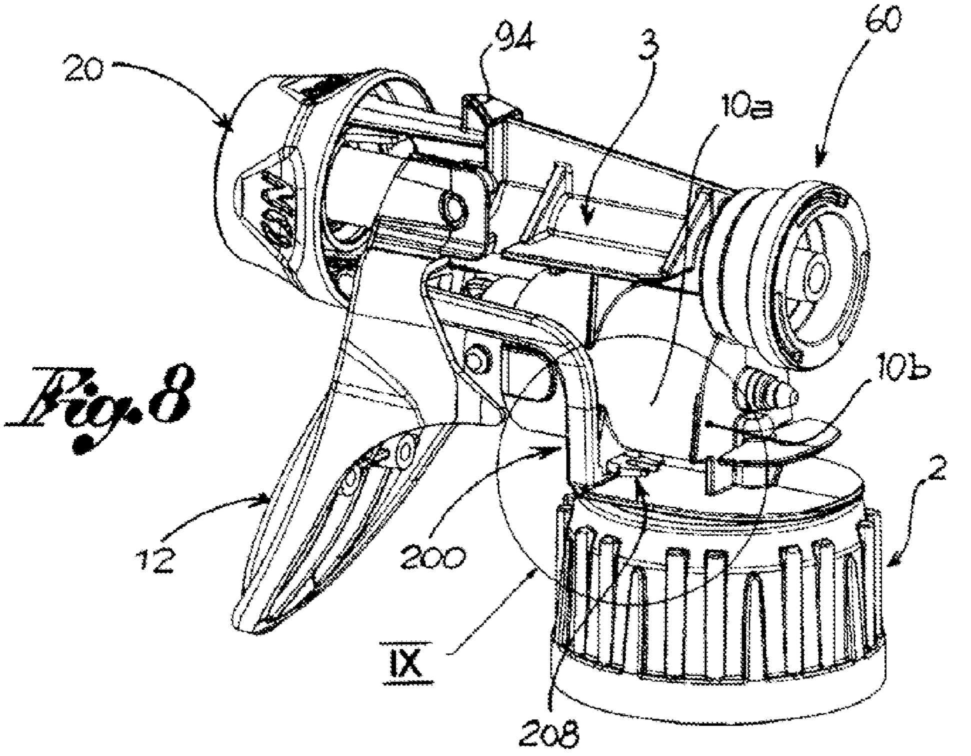
Fig. 8

TRIGGER DISPENSER FOR LIQUIDS WITH BUTT VALVES

This application is a National Stage Application of PCT/IB2011/050907, filed Mar. 3, 2011, which claims the priority of Italian Patent Application No. BS2010A000077, filed Apr. 14, 2010, which are incorporated herein by reference.

The present invention relates to a trigger dispenser device for a liquid.

Trigger dispenser devices are extremely widespread, and used in various sectors, for example to spray liquid household detergents, deodorant liquids, liquids for ironing clothes. The production volumes of such devices are enormous; today, several hundred million pieces are produced per year.

One of the most widely felt needs in the sector is the chemical compatibility of the internal components of the dispenser device and the liquid destined to be sprayed, all the more given that such liquids are increasingly aggressive, due to new demands for results, for example in the sector of household hygiene.

It follows that some dispenser devices are particularly indicated for use with some types of products, while other devices are specially designed for more aggressive liquids. The difference between such devices is not just in the polymers used to make the internal components, but also in the form and functioning of such components, in that some materials reveal greater or lesser limitations in assuming the desired shape and behaviour for optimal use of the device.

The purpose of the present invention is to overcome the aforesaid drawbacks, by making a trigger dispenser device which is economical to produce and also suitable for particularly aggressive liquids.

Such purpose is achieved by a dispenser device according to claim 1,

The characteristics and advantages of the trigger dispenser device according to the present invention will be evident from the description given below, made by way of a non-limiting example, according to the appended drawings, wherein:

FIG. 8 shows the dispenser device without the cover;

FIG. 9 shows an enlargement of the frame IX in FIG. 8; and

FIG. 10 shows a return element of the dispenser device.

Figure 1:
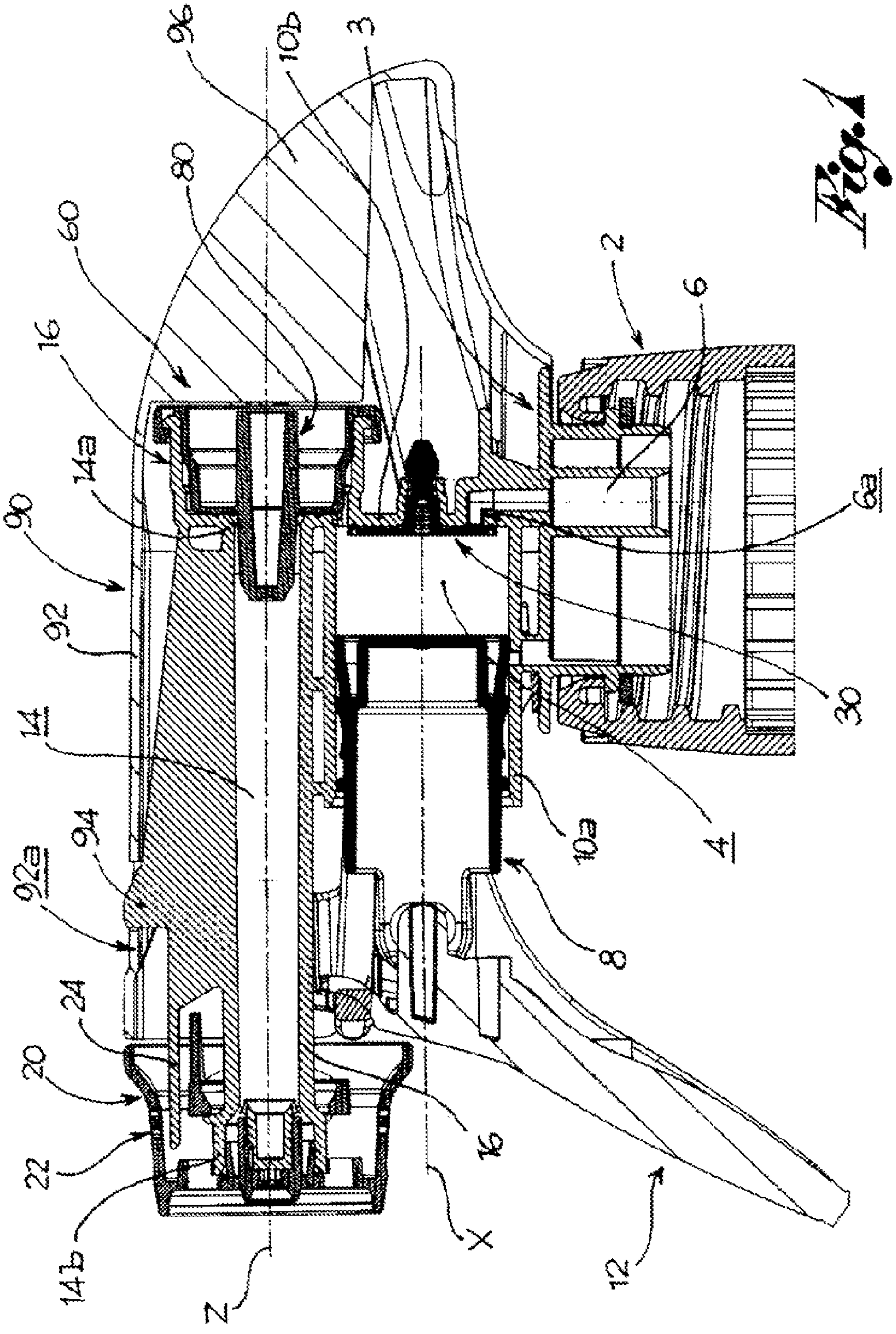
FIG. 1 shows a cross-section view of the dispenser device according to the present invention, according to one embodiment.
Figure 2:
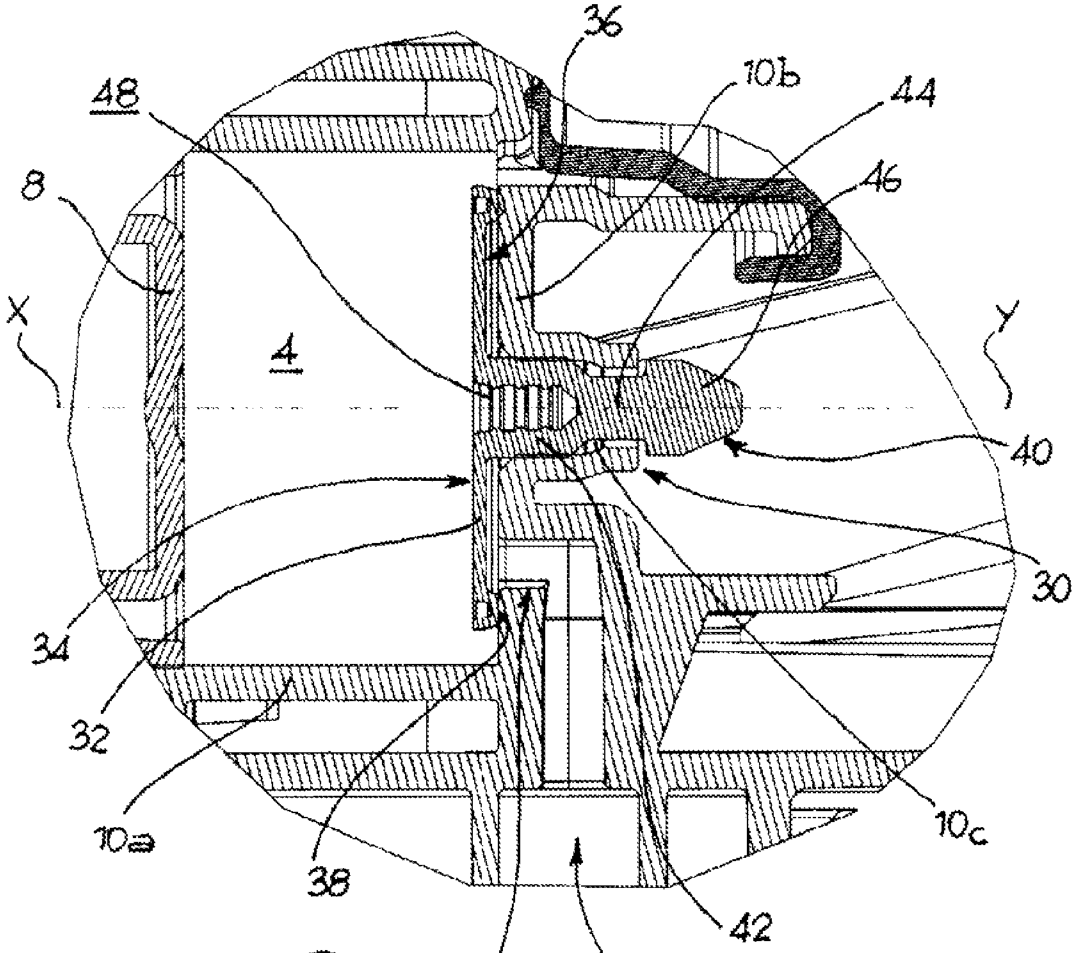
FIG. 2 shows a detail of the cross-section in FIG. 1, showing a suction valve of the device.
Figure 3:
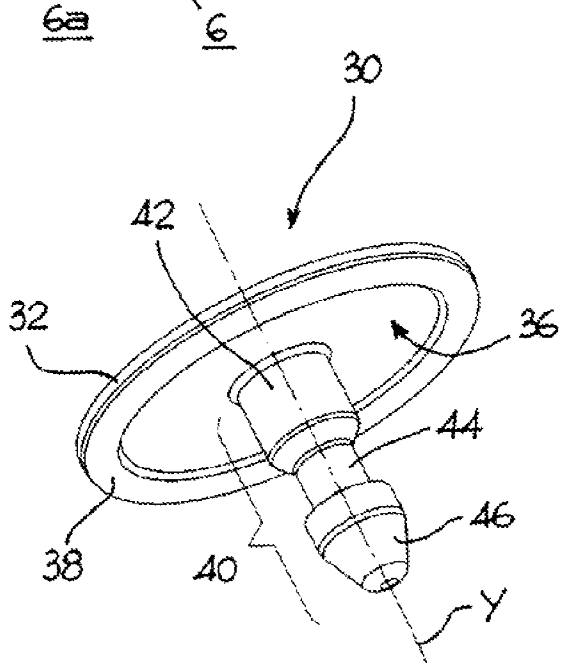
FIG. 3 shows the suction valve in FIG. 2.
Figure 4:
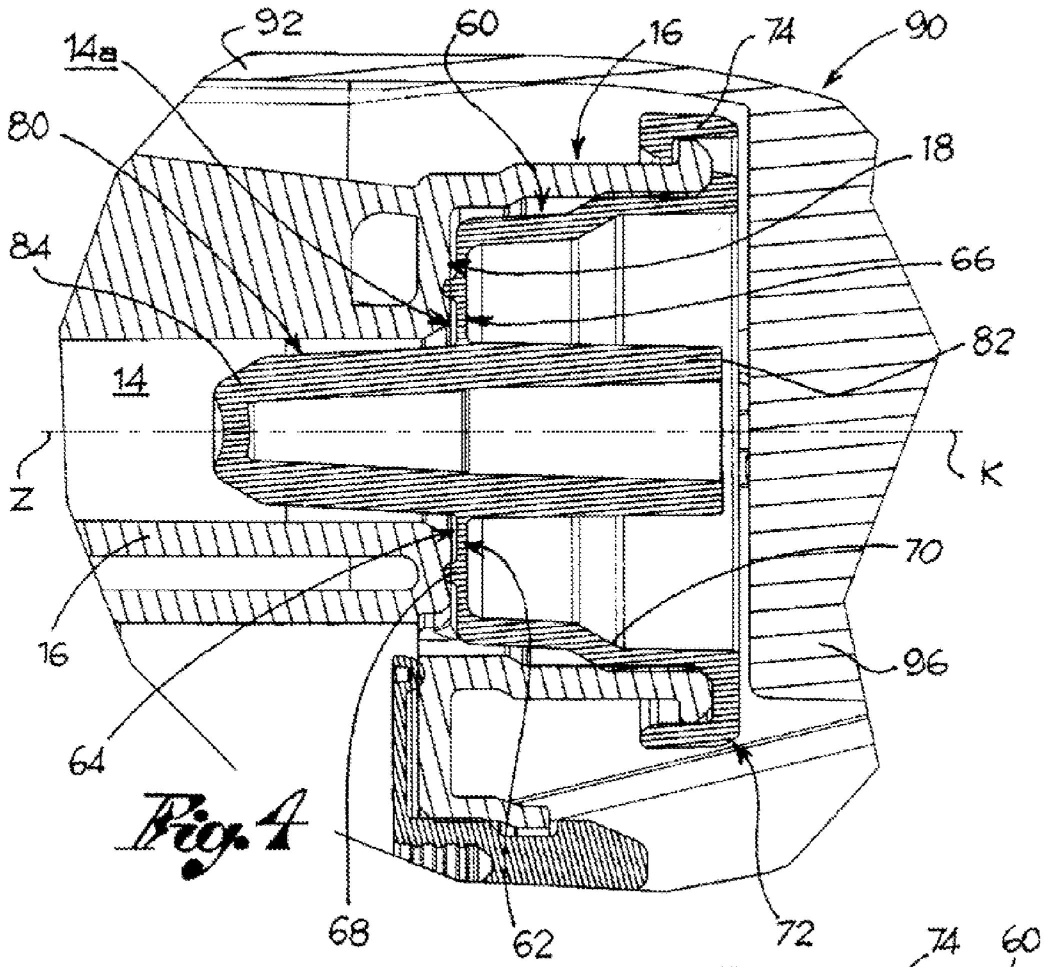
FIG. 4 shows a detail of the cross-section in FIG. 1, showing a delivery valve of the device.
Figure 5:
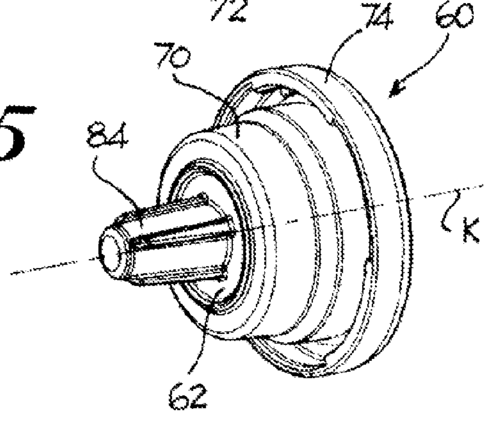
FIGS. 5 and 6 shows the delivery valve in FIG. 4.
Figure 6:
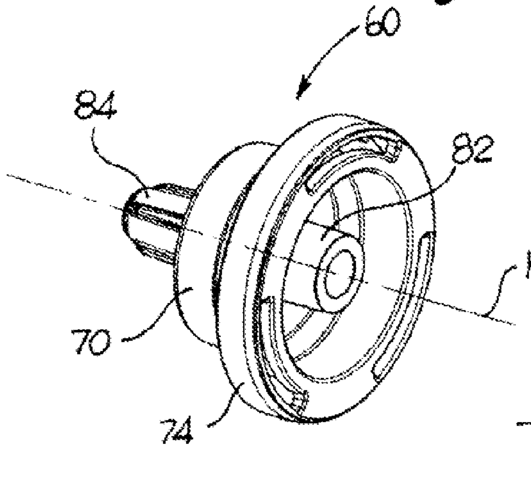

A dispenser assembly for a liquid comprises a container, to contain the liquid to be dispensed, and a manually operated trigger dispenser device 1, mechanically connected to the container.

For example, the device 1 comprises a closure 2 for connection with the neck of the bottle, for example for a threaded or bayonet coupling.

The device 1 further comprises a frame 3, generally made in polymer material, usually in one piece, for the support of the other components.

In particular, the device 1 comprises pumping means suitable to aspirate the liquid from the container and to spray it outwards of the said device.

For example, the pumping means comprise a pumping chamber 4 suitable to be placed in fluidic communication with the container; for example, the frame 3 comprises a suction pipe 6 open at one end towards the container and such as to come out, at the opposite end, in the chamber 4.

The pumping means further comprise a piston 8, sliding sealed in the chamber 4 along a piston axis X.

For example, the frame 3 comprises a chamber wall 10*a*, for example cylindrical, with axis coinciding with the piston axis X, which annularly defines the chamber 4, and a bottom wall 10*b*, for example perpendicular to the piston axis X, placed opposite the piston head 8, which defines the bottom of the chamber 4.

Preferably, the suction pipe 6 comes out into the pumping chamber 4 through the suction opening 6*a* made in said bottom wall 10*b*.

In addition, the device 1 comprises actuation means with manual activation, suitable to be moved, to move the piston 8 in translation.

For example, the actuation means comprise a trigger 12, supported by the frame 3, for example hinged to it or translatable on it. The trigger 12 is engageable with the piston 8 to move said piston in translation.

The piston 8 is slidable in the chamber 4 between an initial rest or rearward position, wherein the volume of the chamber 4 at its maximum, and a final dispensing or forward or end stop position, wherein the volume of the chamber 4 is at its minimum.

Preferably, moreover, the actuation means comprise return means suitable for constantly influencing the trigger towards the initial rest position. For example, said return means comprise an elastic element 200.

Furthermore, the device 1 comprises a dispensing pipe 14 suitable to be placed in fluidic communication with an inlet opening 14*a*, with the pumping chamber 4 and, at the outlet opening 14*b*, with the outside environment, to spray the liquid into the environment.

For example, the frame 3 comprises an annular duct wall 16 around the dispensing axis Z, which annularly defines the dispensing pipe 14.

The dispensing pipe extends along the dispensing axis Z, preferably distinct and parallel with the piston axis X.

In correspondence of the inlet opening 14*a*, outside the dispensing pipe 14, the frame 3 comprises a support wall 16, for example an annular wall axial-symmetric to the dispensing axis Z.

Around the inlet opening 14*a*, outside the dispensing pipe 14, a crown surface 18 is made which surrounds said inlet opening 14*a* given that the support wall 16 is larger in size than said inlet opening 14*a*.

Preferably, moreover, the device 1 comprises a nozzle 20 applied to the outlet end 14*b* of the dispensing pipe 14, to place the outgoing liquid in vortication or to nebulise it or to close/open the dispensing pipe exit.

One embodiment of such nozzle is described, for example, in the document BS2010A000003 in the Applicant's name, the teaching of which is herein incorporated.

Preferably, moreover, the nozzle 20 is provided with apertures 22 on the lateral wall, to form a functioning indicator, together with a jutting wall 24 of the frame 3, positioned below said aperture 22.

The embodiment details of a dispenser device having a nozzle fitted with functioning indicator is described, for example, in the document BS2009A000195 in the Applicant's name, the teaching of which is herein incorporated.

Preferably, the device 1 comprises suction valve means suitable to permit the passage of liquid from the suction pipe 6 to the pumping chamber 4 when the piston 8 returns from the final position to the initial position and suitable to limit or prevent the return of the liquid from the pumping chamber 4 to the suction pipe 6 when the piston translates from the initial position to the final position.

The suction valve means comprise a suction valve 30 suitable to fluidically separate the pumping chamber 4 from the suction pipe 6, applied to the bottom wall 10*b* of the chamber 4, so as to surmount or cover the suction opening 6*a*.

The suction valve 30 comprises a diaphragm 32, which surmounts the suction opening 6*a*, having a front side 34, facing the piston 8, and a rear side 36, preferably axial-symmetric to a valve axis Y.

Preferably, the valve axis Y coincides with the piston axis X.

The valve 30 further comprises, according to one embodiment, a continuous annular boss 38, projecting axially from the rear side 36 of the diaphragm 32.

Preferably, moreover, the valve 30 comprises a stem 40, projecting from the rear side 36, preferably along the valve axis Y. The stem 40 is suitable to snap-couple to the bottom wall 10*b*, for example through the thickness crossing a hole 10*c* made through the thickness of said bottom wall 10*b*.

Preferably, from the inside of the chamber 4 outwards, along the valve axis Y, the stem 40 comprises a sealing section 42, which has a diameter suitable to be inserted in the hole 10*c* so as to seal it, a reduced section 44 and a head 46, preferably pointed, for snap-insertion in the hole 10*c*.

Preferably, moreover, the valve 30 has an axial compartment 48, extending along the valve axis Y, open on the front side 34 and blind.

Preferably, moreover, the device 1 comprises delivery valve means suitable to permit the passage of the pressurised liquid from the pumping chamber 4 to the dispensing pipe 14 when the piston translates from the initial position to the final position.

The delivery valve means comprise a delivery valve 60, applied to the intake of the dispensing pipe 14, that is, in correspondence with the inlet opening 14*a*.

The delivery valve 60 comprises a flexible baffle 62, having a front surface 64 facing the dispensing pipe 14, and a rear surface 66, positioned so as to abut with the crown surface 18, preferably axial-symmetric to a delivery valve axis K.

Preferably, the delivery valve axis K coincides with the dispensing axis Z.

Preferably, moreover, the delivery valve 60 comprises a continuous annular boss 68, projecting axially from the rear side 64 of the baffle 62.

According to a preferred embodiment, the delivery valve 60, comprises a connection wall 70, projecting axially from the rear side 66 of the baffle 62, which can be hooked to the support wall 16 of the frame 3.

In particular, at the free annular end 72, opposite the baffle 62, the connection wall 70 comprises a welt 74 suitable to hook onto the support wall 16.

Preferably, moreover, the delivery valve 60 comprises a sleeve 80 having an axial extension, composed of a tubular element projecting from the baffle 62.

Preferably, the sleeve 80 comprises an abutment section 82 projecting axially from the rear surface 66 of the baffle 62, for example so as to remain axially contained in the connection wall 70.

Preferably, moreover, the sleeve 80 comprises an auxiliary section 84 projecting axially from the front surface 64 of the baffle 62, inserting a section of itself into the dispensing pipe 14, without obstructing it.

Preferably, moreover, the sleeve is itself made in one piece and in one piece with the baffle 62; the sleeve 80 is closed at the front, while at the rear it is open, to facilitate assembly of the valve to the frame.

According to a preferred embodiment, moreover, the device 1 comprises a cover 90 supported by the frame 3, to cover said frame and the inside components. The trigger 12 and preferably the nozzle 20 project from the cover 90.

Preferably, the cover 90 comprises an upper portion 92 which extends along the dispensing pipe 14, as far as the nozzle 20. Preferably, said upper portion 92 has at least one indicator opening 92*a*, from which a signalling portion 94 of the frame 3 preferably projects or is visible, preferably in colour contrast with said upper portion 92, to form a signal.

According to one embodiment, moreover, the cover 90 comprises a rear portion 96, positioned rearwards of the delivery valve 60, in relation to the dispensing axis Z.

In a rest configuration of the dispensing device, the rear portion 96 of the cover 90 is axially distanced from the sleeve 80 of the delivery valve 60; in a dispensing configuration rather, wherein the baffle 62 is deformed to permit the passage of pressurised liquid into the dispensing pipe, the sleeve 80 axially abuts with the rear portion 96 of the cover 90, to form an end stop.

Figure 7:
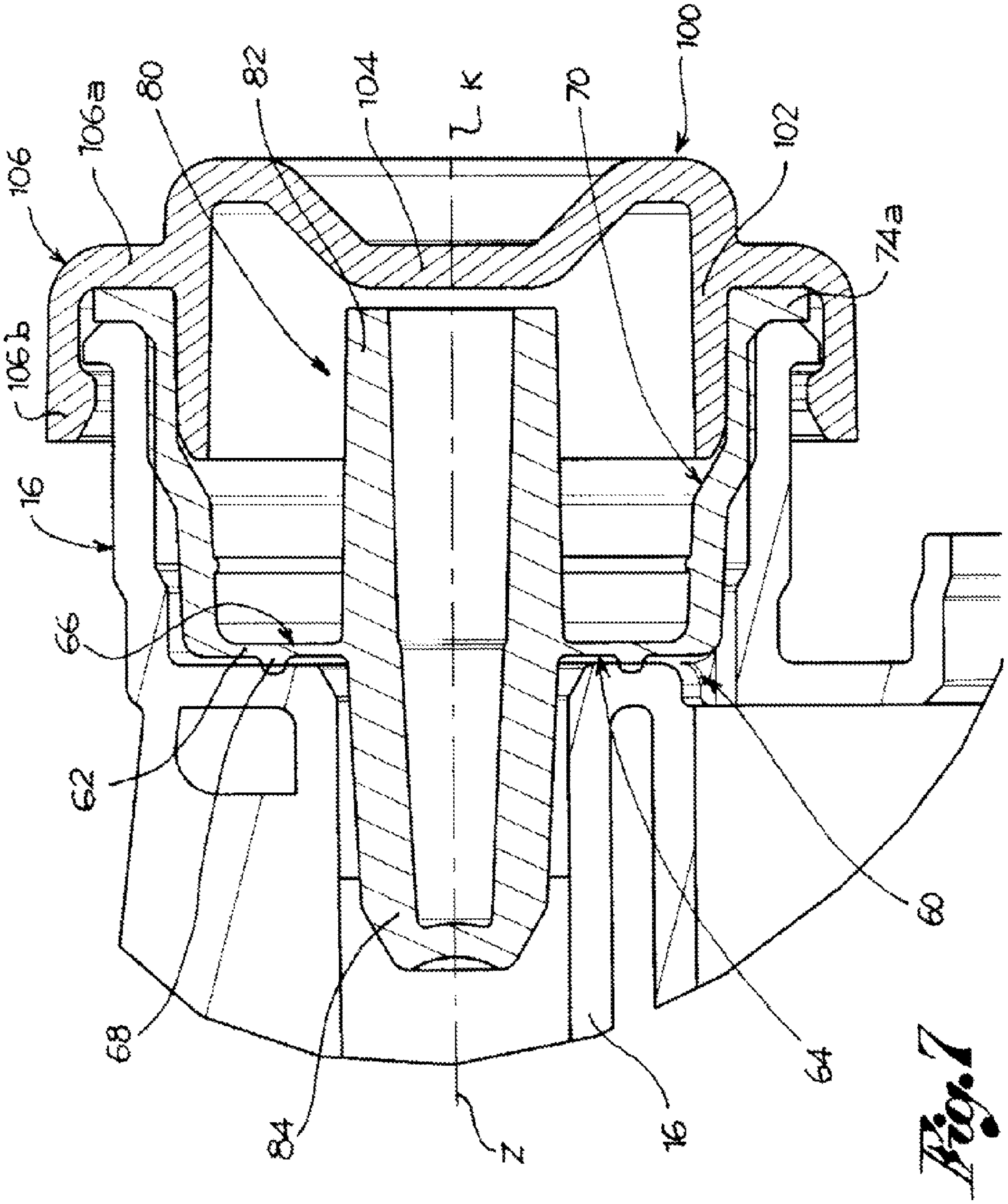
FIG. 7 shows a cross-section view of a further embodiment of the delivery valve.

According to a further embodiment (FIG. 7), the delivery valve 60 has a free end 72 of the connection wall 70 which ends in a radial, annular base crown 74*a*, placed in axial abutment with the support wall 16 of the frame 3.

According to such embodiment the device 1 further comprises, in addition, a stop 100 applied rearwards of the delivery valve 60, connected to the support wall 16 of the frame 3.

For example, the stop 100 is engageable by snap-coupling with the support wall 16.

In such configuration therefore, the abutment for the delivery valve, formed by the stop 100, is structurally independent of the cover 90.

Advantageously, this makes it possible to simplify production of the device and, in addition, to free the cover of functional tasks in relation to the delivery valve. In other words, advantageously, this makes it possible to assign the cover a solely aesthetic role, without the impact it is usually subjected to, detracting from the functioning of the inside components.

In particular, the stop 100 comprises a cup element 102 inserted in the support wall 16, a bottom 104, on the bottom of the cup element 102, positioned rearwards of the sleeve 80, and an annular arm 106, which extends externally to the cup element 102.

The annular arm 106 comprises A radial portion 106*a*, which extends radially outwards of the cup element 102, and an axial portion 106*b*, connected to the radial portion, which extends axially so as to snap-couple to the support wall 16.

The base crown 74*a* of the connection wall 70 is thereby constrained between the end of the support wall 16 and the radial portion 106*a* of the annular arm 106.

Moreover, the cup element 102 is axially overlapped, at least along one section, with the connection wall 70 of the delivery valve 60.

Said connection wall 70 is therefore pushed radially by the cup element 102 against the support wall 16 of the frame 3, so as to block the connection wall 70 and produce forced adhesion of the connection wall 70 to the support wall 16.

Such configuration has proven particularly advantageous, in that the delivery valve acts as a pre-compression valve, opening to transit of the liquid towards the dispensing pipe only when the action of the liquid exceeds a predefined pressure threshold.

In a rest configuration of the dispensing device, the rear portion 104 of the stop 100 is axially distanced from the sleeve 80 of the delivery valve 60; in a dispensing configuration rather, wherein the baffle 62 is deformed to permit the passage of pressurised liquid into the dispensing pipe, the sleeve 80 axially abuts with the rear portion 104 of the stop 100, to form an end stop.

The device 1 is fitted with return means, comprising the elastic element 200, suitable for constantly influencing the trigger 12 towards the initial rest position.

The elastic element 200 is positioned externally to the pumping chamber 4, engaged on one side with the trigger 12, for example near the connection of said trigger to the piston 8, and on the other side connected to the frame 3.

Preferably, the elastic element 200 is symmetric to the piston axis X and is positioned astride the pumping chamber 4.

According to a preferred embodiment, the elastic element 200 comprises a transversal bar 202, engaged with the trigger 12, extending along a transversal axis W perpendicular to the imaginary plane on which the piston axis X and the dispensing axis Z lie.

Preferably, moreover, the elastic element 200 comprises a pair of arched arms 204, parallel and transversally distanced, between which the pumping chamber 4 is contained, which extend axially starting from the transversal bar 202.

Preferably, moreover, the elastic element 200 comprises a connection bar 206, which joins the two arched arms 204 on the side opposite the transversal bar 202.

The connection bar 206 snap-couples to the frame 3, for example in the area under the pumping chamber.

For example, the elastic element 200 comprises at least one insert projecting axially from the connection bar 206, snap-coupling to the frame. For example, a pair of inserts 208 is envisaged, each preferably formed of a pair of flexible prongs.

During normal use, the device 1 is mechanically connected to the container and a tube is usually connected to the suction pipe 6, to aspirate the liquid contained in the container.

According to a preferred embodiment, the suction valve and/or the delivery valve are made by moulding, for example in low-density polyethylene (PELD); preferably, moreover, the elastic element is moulded, for example in acetalic resin (POM); preferably, in addition, the stop is moulded, for example in polypropylene (PP).

In an initial configuration, let us assume that the pumping chamber 4 already contains aspirated liquid and that the piston is in the initial rest position.

By operating the trigger 12, the piston 8 translates from the initial position towards the final position, pressing the liquid contained in the pumping chamber 4, constituting a dispensing step of use of the device.

During the dispensing step, the liquid acts on the suction valve 30, pressing the diaphragm 32, which covers the suction opening 6*a* of the dispensing pipe 6, against the bottom wall 10*b*, so as to create a seal against the return of the liquid from the chamber 4 towards the container.

In particular, the boss 38, which surrounds the suction opening 6*a* externally to the suction pipe, is pressed against the bottom wall 10*b*, ensuring the seal.

In addition, during the dispensing step, the liquid acts on the delivery valve 60 so as to distance the baffle 62 from the crown surface 18 which surrounds the inlet opening 14*a* of the dispenser pipe 14.

In particular, the liquid seeps between the baffle 62 and the crown surface 18, outside the annular boss 68, causing the detachment of the baffle 62 from the crown surface and therefore the entrance of the pressurised liquid into the dispensing pipe 14.

The baffle 62 is limited in its backward movement by the sleeve 80 which during the dispensing step goes to abut against the rear portion 96 of the cover 90 or of the bottom 104 of the stop 100, depending on the embodiment.

During the dispensing step, the elastic element 200 deforms elastically; in particular, the arched arms 204 arch further than in the un-deformed condition.

At the end of the dispensing step, the piston is in the final position and the trigger is released. The return means act on the trigger to bring it back again, simultaneously dragging the piston from the final position towards the initial position, constituting return step of use of the device.

During the return step, a depression is created in the pumping chamber 4, by virtue of the sealed sliding of the piston 8.

During the return step, the diaphragm 32 of the suction valve 30 separates from the bottom wall 10*b* and the depression permits suction of the liquid from the container into the pumping chamber 4.

In the return step, furthermore, the baffle 62 of the dispenser valve 60 remains in contact with the crown surface 18.

Innovatively, the dispensing device according to the present invention permits use even with very aggressive liquids, while remaining economical to produce. This is due to the particular conformation and functioning of the valves, which can be made with materials difficult to work with.

Advantageously, moreover, the device is very easy to assemble, and therefore permits a lowering of machine-time and consequent increase in production.

In particular, many components are coaxial, enabling very rapid assembly; in addition, many components are axial-symmetric, thereby preventing problems of orientation during assembly.

According to a further advantageous aspect, the components are firmly connected to the frame, to prevent accidental dismantling, for example during transport; in addition, the connection is often a snap-coupling, leading to high speed and reliable assembly.

It is clear that a person skilled in the art may make modifications to the device described above so as to satisfy contingent requirements.

For example, according to one embodiment, the piston axis and dispensing axis are separate and incident.

Such variations are also contained within the sphere of protection as defined by the appended claims.

The invention claimed is:

1. Triggered dispensing device for a liquid, comprising:

a pumping chamber and a piston sliding sealed in the pumping chamber along a piston axis, the chamber having a bottom wall, wherein the bottom wall is perpendicular to a piston axis along which the piston slides, and where a pumping chamber inlet and a pumping chamber outlet are located along a vertical line extending along a surface of the bottom wall and separated by a length of the bottom wall;

a trigger operatively connected to the piston to move it:

a suction pipe fluidly connectable to a container of the liquid to be dispensed, wherein the suction pipe is connected with the pumping chamber through a suction opening obtained in the bottom wall;

a dispensing pipe having extension along a dispensing axis, fluidly connected at an extremity to the pumping chamber through an inlet opening and, at the other extremity, fluidly connected with the outside environment, wherein the inlet opening is surrounded, outside the dispensing pipe, by a crown surface;

a suction valve comprising a diaphragm housed in the pumping chamber, suitable for regulating the flow of fluid between the suction pipe and the pumping chamber, wherein the suction valve is applied to the bottom wall where the bottom wall is perpendicular to the piston axis along which the piston slides;

a delivery valve, structurally distinct from the suction valve, comprising a baffle outside the dispensing pipe, suitable for regulating the flow of fluids between the pumping chamber and the dispensing pipe, wherein the diaphragm of the suction valve, in the liquid dispensing phase, is abutting on the bottom wall and covers the suction opening, and wherein the baffle of the delivery valve, in the return phase, is abutting on the crown surface which surrounds the inlet opening of the dispensing pipe.

2. Device according to claim 1, wherein the piston axis is parallel and distinct from the dispensing axis.

3. Device according to claim 1, wherein the suction valve is snap-coupled to the bottom wall.

4. Device according to claim 1, wherein the diaphragm of the suction valve is axial-symmetric with respect to a suction valve axis.

5. Device according to claim 1, wherein the delivery valve comprises a sleeve projecting from the baffle along a delivery valve axis, on the opposite side respect to the dispensing pipe, to create a stop during the dispensing phase.

6. Device according to the claim 5, wherein the delivery valve axis coincides with the dispensing axis.

7. Device according to claim 5, wherein the delivery valve is made in a single piece in low-density polyethylene.

8. Device according to claim 1, comprising a cover to cover the inside components.

9. Device according to claim 1, comprising return means suitable for constantly influencing the trigger or the piston from the end position to the initial position.

10. Device according to the claim 9, wherein the return means comprise an elastic element snap-coupled to a frame of the device.

11. Device according to claim 1, wherein the suction valve is made in a single piece.

12. Device according to claim 11, wherein the suction valve is in low-density polyethylene (PELD).

13. Device according to claim 1, wherein the delivery valve is made in a single piece.

14. Device according to claim 13, wherein the delivery valve is in low-density polyethylene.

15. Triggered dispensing device for a liquid, comprising:

a pumping chamber and a piston sliding sealed in the pumping chamber along a piston axis, the chamber having a bottom wall, wherein the bottom wall is perpendicular to a piston axis along which the piston slides, and where a pumping chamber inlet and a pumping chamber outlet are located along a vertical line extending along a surface of the bottom wall and separated by a length of the bottom wall;

a trigger operatively connected to the piston to move it:

a suction pipe fluidly connectable to a container of the liquid to be dispensed, wherein the suction pipe is connected with the pumping chamber through a suction opening obtained in the bottom wall;

a dispensing pipe having extension along a dispensing axis, fluidly connected at an extremity to the pumping chamber through an inlet opening and, at the other extremity, fluidly connected with the outside environment, wherein the inlet opening is surrounded, outside the dispensing pipe, by a crown surface;

a suction valve comprising a diaphragm housed in the pumping chamber, suitable for regulating the flow of fluid between the suction pipe and the pumping chamber, wherein the suction valve is applied to the bottom wall, wherein the diaphragm of the suction valve is axial-symmetric with respect to a suction valve axis, and wherein the suction valve axis coincides with the piston axis;

a delivery valve, structurally distinct from the suction valve, comprising a baffle outside the dispensing pipe, suitable for regulating the flow of fluids between the pumping chamber and the dispensing pipe, wherein the diaphragm of the suction valve, in the liquid dispensing phase, is abutting on the bottom wall and covers the suction opening, and wherein the baffle of the delivery valve, in the return phase, is abutting on the crown surface which surrounds the inlet opening of the dispensing pipe.

16. Device according to claim 15, wherein the piston axis is parallel and distinct from the dispensing axis.

17. Device according to claim 15, wherein the suction valve is snap-coupled to the bottom wall.

18. Device according to claim 15, wherein the delivery valve comprises a sleeve projecting from the baffle along a delivery valve axis, on the opposite side respect to the dispensing pipe, to create a stop during the dispensing phase.

19. Device according to the claim 18, wherein the delivery valve axis coincides with the dispensing axis.

* * * * *